(12) United States Patent
Guellec et al.

(10) Patent No.: US 11,059,360 B2
(45) Date of Patent: Jul. 13, 2021

(54) ENCAPSULATED FIXED WINDOW MODULE FOR A MOTOR VEHICLE

(71) Applicant: HUTCHINSON SEALING SYSTEMS, Auburn Hills, MI (US)

(72) Inventors: André Guellec, Bloomfield Hills, MI (US); Phil Park, Auburn Hills, MI (US); Mark Laberge, Auburn Hills, MI (US)

(73) Assignee: HUTCHINSON SEALING SYSTEMS, Auburn Hills, MI (US)

( * ) Notice: Subject to any disclaimer, the term of this patent is extended or adjusted under 35 U.S.C. 154(b) by 260 days.

(21) Appl. No.: 16/132,182

(22) Filed: Sep. 14, 2018

(65) Prior Publication Data

US 2020/0086727 A1    Mar. 19, 2020

(51) Int. Cl.
*B60J 10/78*      (2016.01)
*B60J 10/76*      (2016.01)
*B60J 1/10*       (2006.01)
*B60J 1/17*       (2006.01)
*B60J 10/74*      (2016.01)

(52) U.S. Cl.
CPC ............. *B60J 10/78* (2016.02); *B60J 1/10* (2013.01); *B60J 1/17* (2013.01); *B60J 10/74* (2016.02); *B60J 10/76* (2016.02)

(58) Field of Classification Search
CPC ... B60J 10/78; B60J 10/74; B60J 10/76; B60J 1/10
See application file for complete search history.

(56) References Cited

U.S. PATENT DOCUMENTS

| 4,490,942 | A  | * | 1/1985  | Arnheim | B60J 10/24 49/374 |
| 4,653,230 | A  | * | 3/1987  | Seo     | B60J 10/79 49/227 |
| 6,220,650 | B1 | * | 4/2001  | Davis   | B60J 10/78 296/146.16 |
| 6,299,235 | B1 | * | 10/2001 | Davis   | B60J 10/78 296/146.16 |
| 9,920,566 | B1 | * | 3/2018  | Bennett | B60J 10/70 |

(Continued)

FOREIGN PATENT DOCUMENTS

EP    0195578 A2    9/1986
EP    1759903 A2 *  3/2007 ............. B60J 10/88

(Continued)

*Primary Examiner* — Marcus Menezes
(74) *Attorney, Agent, or Firm* — Christensen O'Connor Johnson Kindness PLLC

(57) ABSTRACT

An encapsulated fixed window module for a motor vehicle, includes: a fixed window pane having a peripheral edge extending between exterior and interior surfaces; and a trim strip extending along at least a portion of the peripheral edge, the trim strip including a first longitudinal profile of U-shaped cross section. The first profile defines a longitudinal groove configured to receive a guide carried by a movable window pan. The exterior wall of the first profile faces the interior surface and is secured thereto by an over-molded material which does not cover the peripheral edge along the first profile. The exterior wall has a longitudinal edge which is opposite to the lateral wall and which is substantially aligned with the peripheral edge in a plane that is perpendicular to the fixed window pane.

22 Claims, 6 Drawing Sheets

(56) References Cited

U.S. PATENT DOCUMENTS

| | | | |
|---|---|---|---|
| 9,925,850 B2 * | 3/2018 | Yoshida | B60J 1/10 |
| 10,035,410 B2 * | 7/2018 | Taketomo | B60J 5/047 |
| 10,427,511 B2 * | 10/2019 | Blottiau | B60J 5/0402 |
| 2006/0080824 A1 * | 4/2006 | Ellis | B60J 10/74 |
| | | | 29/527.1 |
| 2010/0001550 A1 * | 1/2010 | Janisch | B60J 10/78 |
| | | | 296/146.2 |
| 2012/0144751 A1 * | 6/2012 | Schapitz | B60J 10/265 |
| | | | 49/431 |
| 2013/0160375 A1 * | 6/2013 | Kuwahara | B60J 10/235 |
| | | | 49/490.1 |
| 2014/0007510 A1 * | 1/2014 | Salzmann | E06B 7/24 |
| | | | 49/483.1 |
| 2017/0349118 A1 * | 12/2017 | Gonnet | B60J 10/365 |
| 2020/0298690 A1 * | 9/2020 | Yu | B60J 10/20 |

FOREIGN PATENT DOCUMENTS

| | | | | |
|---|---|---|---|---|
| FR | 2937289 A1 * | 4/2010 | | B60J 10/79 |
| WO | WO-2010080895 A1 * | 7/2010 | | B60J 1/17 |
| WO | 2011014684 A1 | 2/2011 | | |
| WO | WO-2011014684 A1 * | 2/2011 | | B60J 1/17 |
| WO | WO-2014191812 A1 * | 12/2014 | | B60J 1/006 |

* cited by examiner

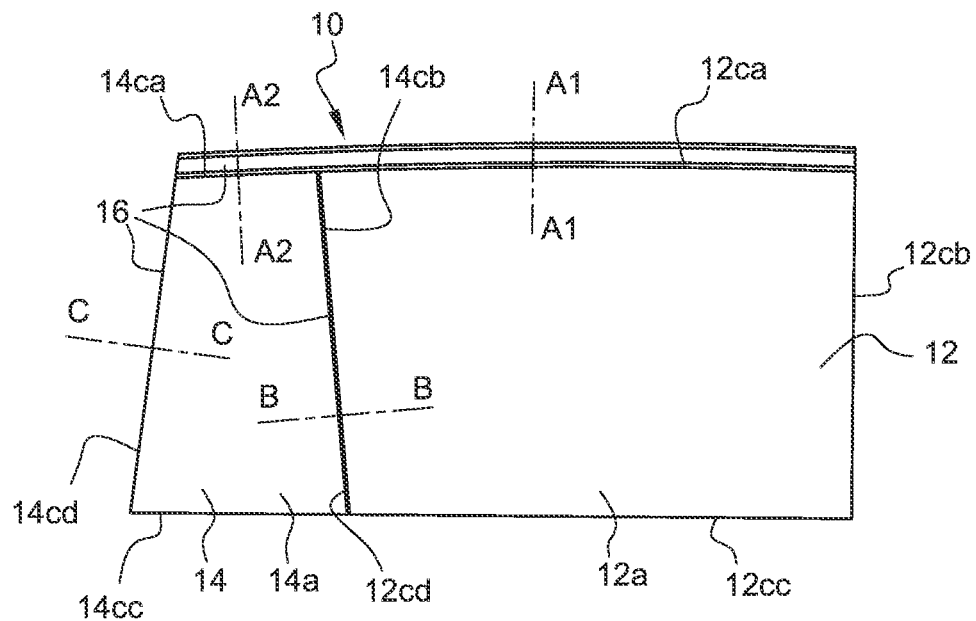
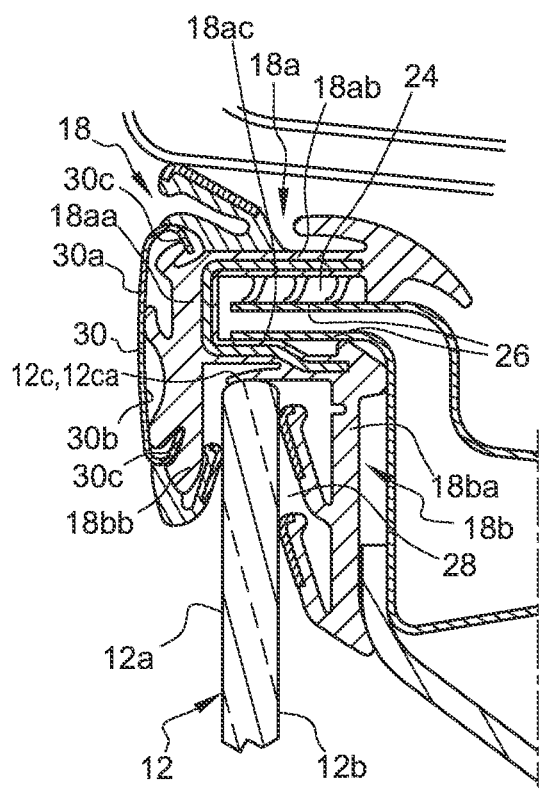
Fig. 2
A1-A1
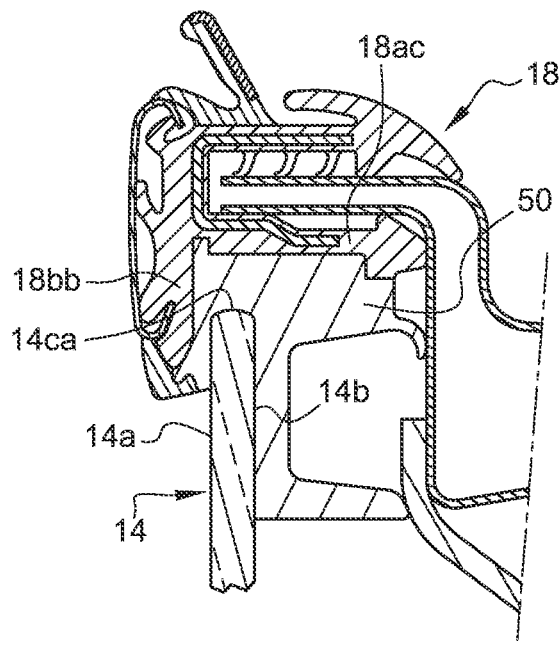
Fig. 3
A2-A2

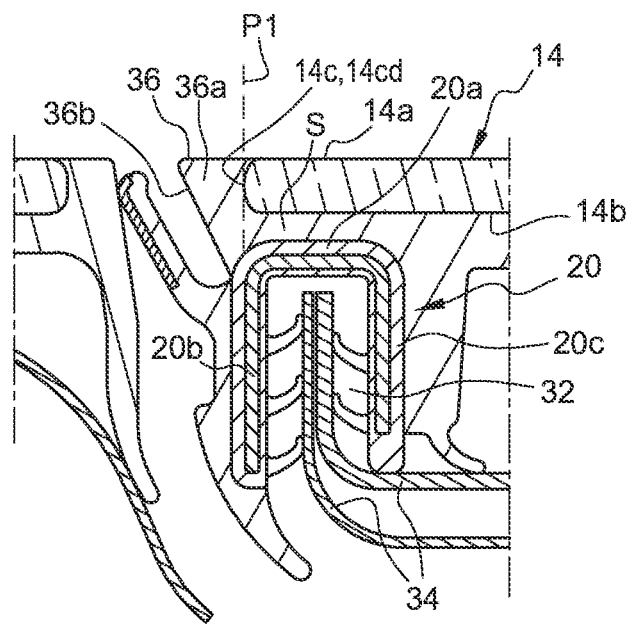
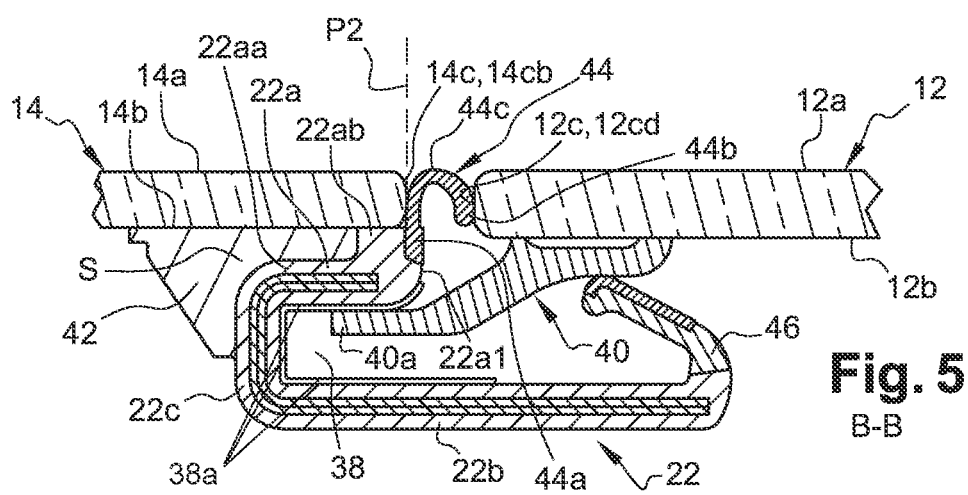
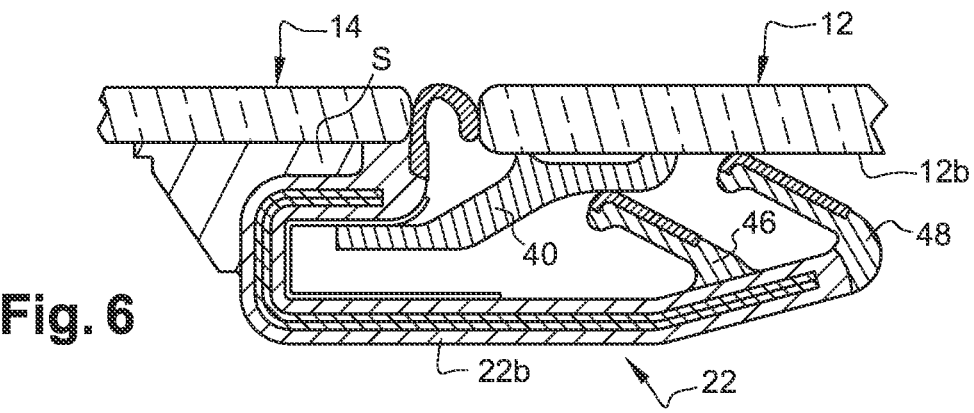

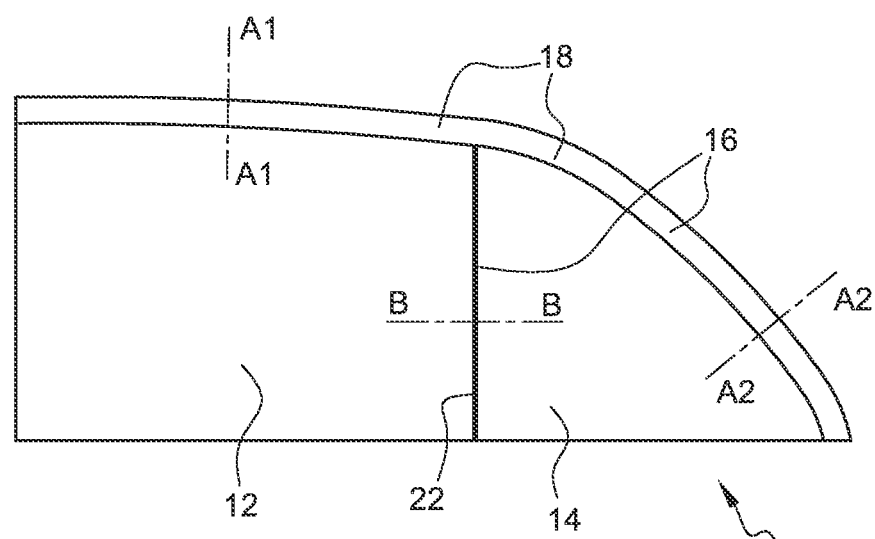
Fig. 7
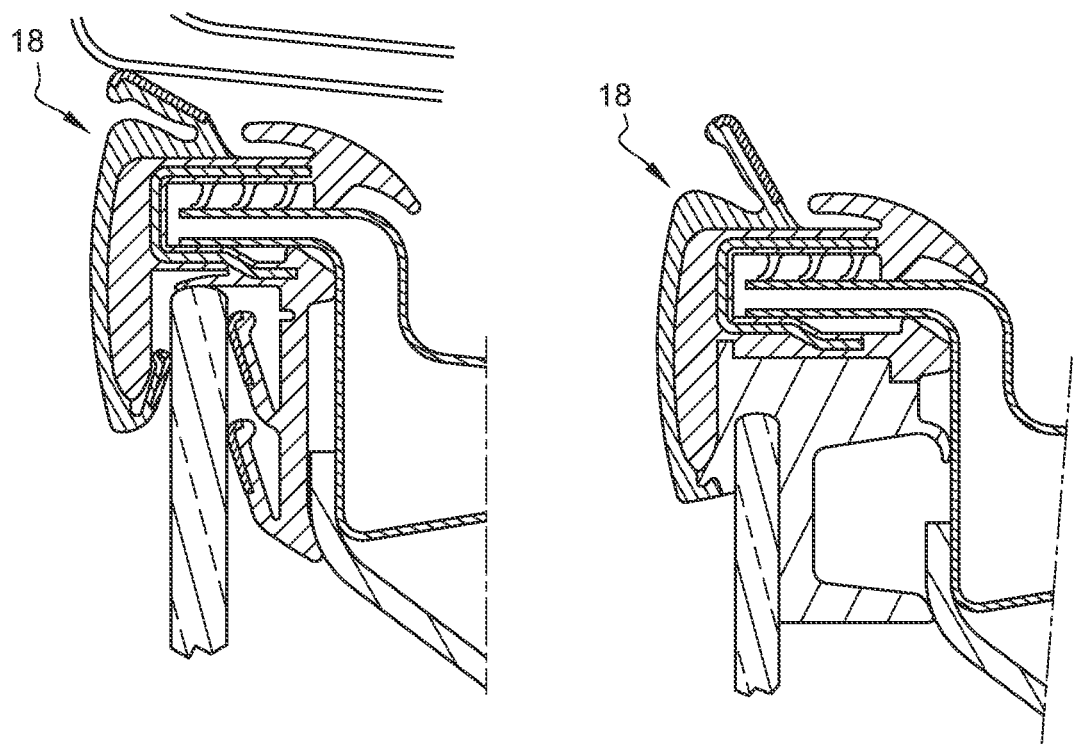
Fig. 8
A1-A1
Fig. 9
A2-A2

C-C

B-B

B-B

B-B

B-B

B-B

B-B

B-B

A1-A1

A2-A2

ENCAPSULATED FIXED WINDOW MODULE FOR A MOTOR VEHICLE

TECHNICAL FIELD

Embodiments of the present disclosure relate generally to an encapsulated fixed window module for a motor vehicle and such a motor vehicle.

BACKGROUND

In a number of motor vehicles, a door assembly is designed such that there is a first, e.g. forward, window opening that carries a movable window pane and a second, e.g. rearward, opening that is equipped with a fixed window pane. Of course, the forward window pane may be fixed and the rearward window pane may be moveable. Fixed windows of conventional design may be assembled from discrete elements that include the window panel, a post that serves as a track for an adjacent movable window and various configurations of moldings or trim pieces, most specifically an extruded header/B-pillar trim piece that may be mechanically attached to the window module assembly using an interlocking channel or the like.

The trim in some prior art designs comprises an article in the nature of a pre-formed resilient band. In those designs, the window is inserted into a channel of the trim band which resiliently engages the window pane, but often less than securely. Conventional designs suffer from a number of deficiencies due to their assembly from discrete components such as water leakage, noise from the exterior (wind noise) or the interior, and problems generally with fit and finish. In addition, the assembly of these modules is often difficult, particularly where the individual components are manufactured by more than one supplier.

A few of the problems of conventional designs are overcome through the use of over-molding processes by which a portion of the trim surrounding the window pane is fabricated by encapsulating the window periphery with a polymer using injection molding techniques. In essence, the window pane is placed in a mold cavity which is configured to produce a circumferential trim at the pane edges. The edges of the pane on which the injection molded trim will adhere are cleaned and primed to promote adhesion and to create a water-impervious seal in the formed article. The mold is then closed and the material is injected such that the window pane edges are encapsulated to form the desired trim geometry.

The exterior appearance of the window modules is very important for the customer, i.e., the user of the motor vehicle. A solution for enhancing the appearance of a window module is to provide the periphery of the window pane with finished panels which are located outside the motor vehicle and are visible by the user. The finished panels are for instance esthetic metal components which are secured to the window module.

It is also known to enhance the esthetic appearance of a window module by lying flush the outside of its window pane with the outside of the structure surrounding this pane. However, prior art only teaches solutions for movable window modules and panes. The solutions cannot be used as such for a fixed window module since the structure surrounding such module is different from the one of a movable window module.

Thus, there is a need in the art for a fixed window module having a pleasant exterior appearance. There is also a need to limit noise transmission through the window module and to simplify the tooling and assembly process.

The present disclosure provides at least a fixed window module which meets at least in part this need.

SUMMARY

An encapsulated fixed window module for a motor vehicle is provided, comprising:

a fixed window pane having an exterior surface, an interior surface, and a peripheral edge extending between the exterior and interior surfaces;

at least one trim strip extending along at least a portion of the peripheral edge, the trim strip comprising a first longitudinal profile which is U-shaped in cross section and which has an exterior wall, an interior wall, and a lateral wall connecting the exterior and interior walls, the first profile defining a longitudinal groove configured to receive a guiding mean carried by a movable window pane, wherein the exterior wall of the first profile faces the interior surface and is secured thereto by an over-molded material, and wherein the exterior wall has a longitudinal edge which is opposite to the lateral wall and which is substantially aligned with the peripheral edge along the first profile in a plane that is perpendicular to the fixed window pane.

In the present specification, the words "inner", "inside", "interior", etc., make reference to the inside of a motor vehicle. The words "outer" "outside", "exterior", etc., make reference to the outside of the motor vehicle. Then, an outer element is located at the outer side of the vehicle. A first outer element, portion or surface may be visible by a user of the motor vehicle or may be hidden by a second outer element, portion or surface covering the first outer element.

In the present specification, "aligned" and "substantially aligned" mean that two elements are strictly aligned or are aligned in a range 0 to 5 mm, preferably 0 to 3 mm and more preferably 0 to 1 mm.

The present disclosure provides a solution for enhancing the esthetic appearance of a fixed window module. The exterior edge of the trim strip is located at the interior side of the fixed window pane so as to allow reducing the gap between the fixed window pane and the movable window pane and therefore enhancing the "flush" effect between the exterior surfaces of both fixed and movable window panes. This means that these exterior surfaces lie in one plane. In a particular embodiment, such "flush" may be considered as provided by the repositioning of the window pane outward compared to existing solutions. The "flush" solution may improve the sealing condition, reduce passenger cabin noise and provide a pleasant smooth finish.

The encapsulated fixed window module according to the disclosure may comprise one or more of the following features, taken alone from each other or in combination with each other:

the over-molded material does not cover the peripheral edge along the first profile;

the longitudinal edge of the exterior wall carries a first sealing lip which is configured to abut against the peripheral edge of the fixed window pane and also against a peripheral edge of the movable window pane;

the first sealing lip is the sole member extending between the peripheral edges of the fixed window pane and of the movable window pane, along the first profile;

the first sealing lip has a connecting edge which extends in the plane;

the exterior wall of the first profile is applied onto the interior surface;

the exterior wall is L-shaped in cross section and includes first and second parts that are perpendicular one another, the first part being spaced from the interior surface and extending between the lateral wall and the second part, the second part being applied directly onto the interior surface;

the first part defines a space with the interior surface that is filled in with the over-molded material;

the over-molded material extends at least between the exterior and lateral walls and the interior surface;

the interior wall crosses the plane and is configured to face the guiding mean, and preferably also to face an interior surface of the movable window pane;

the interior wall carries a second sealing lip which is configured to be in sealing contact with the guiding mean;

the interior wall carries a third sealing lip which is configured to be in sealing contact with the movable window pane;

the exterior wall is coated with an antifriction layer inside the longitudinal groove;

the lateral wall is coated with an antifriction layer inside the longitudinal groove;

the interior wall is coated with an antifriction layer inside the longitudinal groove;

the module further comprises a second longitudinal profile which is U-shaped in cross section and which has an exterior wall connecting therebetween two lateral walls, the second profile defining a longitudinal groove configured to receive a metallic frame of the motor vehicle;

the exterior wall of the second profile is parallel to the interior surface and is secured thereto by an over-molded material, one of the lateral walls of the second profile being substantially aligned with a portion of the peripheral edge in a plane that is perpendicular to the fixed window pane, and the other of the lateral walls of the second profile extending perpendicularly and facing the interior surface;

the exterior wall of the second profile is spaced from the interior surface;

the module further comprises a third longitudinal profile which connects therebetween first and second longitudinal profiles;

the module further comprises a third longitudinal profile which extends along at least an upper portion of the peripheral edge of the fixed window pane, and which is adjacent to the profile;

the third longitudinal profile comprises first and second U-shaped portions, the first U-shaped portion being configured to receive a metallic frame of the motor vehicle and the second U-shaped portion being configured to receive by sliding the movable window pane;

the first and second U-shaped portions define respectively two longitudinal grooves which are perpendicular one another.

Overmolded strip profiles are generally discrete elements linked together with the overmolded material which has the double function of connecting the strip profiles together and of connecting the strip profiles to the interior surface/peripheral edges of the fixed window pane.

The disclosure further proposes a motor vehicle, comprising at least one encapsulated fixed window module as defined above.

The motor vehicle may comprise a door including a door frame, a movable window pane, and the encapsulated fixed window module, the movable window pane having an exterior surface, an interior surface, and a peripheral edge extending between the exterior and interior surfaces, wherein the exterior surfaces of the encapsulated fixed window module and of the movable window pane are substantially coplanar.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a fragmentary side view of an encapsulated fixed window module in accordance with the disclosure;

FIG. 2 is a cross sectional view along line A1-A1 of FIG. 1;

FIG. 3 is a cross sectional view along line A2-A2 of FIG. 1;

FIG. 4 is a cross sectional view along line C-C of FIG. 1;

FIG. 5 is a cross sectional view along line B-B of FIG. 1;

FIG. 6 is a cross sectional view similar to FIG. 5 and showing a variant of the encapsulated fixed window module;

FIG. 7 is a fragmentary side view of another encapsulated fixed window module in accordance with the disclosure;

FIG. 8 is a view corresponding to the view of FIG. 2 and showing another embodiment;

FIG. 9 is a view corresponding to the view of FIG. 3 and showing another embodiment;

DETAILED DESCRIPTION

Figure 10:
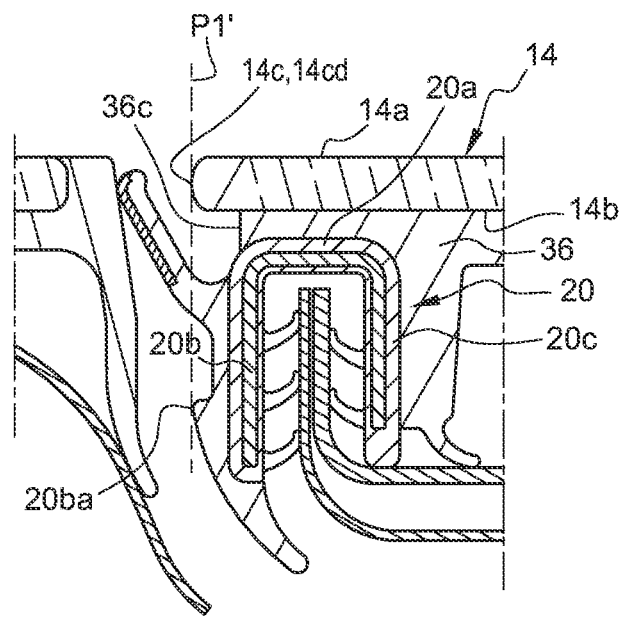
FIG. 10 is a view corresponding to the view of FIG. 4 and showing another embodiment.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIG. 1 of the drawings shows one preferred embodiment of an encapsulated fixed window module 10 for a motor vehicle according to the disclosure.

A motor vehicle door comprises a door frame provided with an encapsulated fixed window module 10 which can be adjacent to a movable window pane 12. In the embodiment of FIG. 1, a rear door of a vehicle is shown in which case the pane 12 is a forward pane and the module 10 is a rearward module. Another embodiment would be on a front door, with in that case the movable window pane 12 positioned rearwardly from the module 10 (see FIG. 7).

The module 10 includes at least a fixed window pane 14 and at least one trim strip 16. In the various embodiments described below, the module 10 includes trim strips 16 which can be either over-molded trim strips or non over-molded trim strips.

Each pane 12, 14 has an exterior surface 12a, 14a intended to be located outside the motor vehicle, an interior surface 12*b*, 14*b* intended to be located inside the motor vehicle, and a peripheral edge 12*c*, 14*c* extending between the exterior and interior surfaces (see FIGS. 2 and 4).

Each pane 12, 14 may be substantially flat. Thus, its surfaces 12*a*, 14*a*, 12*b*, 14*b* may be substantially flat. Of course, the pane 12, 14 and its surfaces may be slightly curved according to the expected design of the module. As shown in FIGS. 2 to 4, the peripheral edge 12*c*, 14*c* may have a cross sectional convex shape.

In the embodiment shown, each pane 12, 14 has a polygonal shape and comprises four longitudinal edges. Each peripheral edge 12*c*, 14*c* includes therefore a top edge 12*ca*, 14*ca*, a front edge 12*cb*, 14*cb*, a bottom edge 12*cc*, 14*cc* and a rear edge 12*cd*, 14*cd* (see FIG. 1).

FIG. 2 is a cross sectional view at the top edge 12*ca* of the movable window pane. FIG. 3 is a cross sectional view at the top edge 14*ca* of the fixed window pane. FIG. 4 is a cross sectional view at the rear edge 14*cd* of the fixed window pane. FIG. 5 is a cross sectional view at the front edge 14*cb* of the fixed window pane and at the rear edge 12*cd* of the movable window pane.

These FIGURES show that the trim strips 16 extend along the edges 14*ca*, 14*cb* and 14*cd* of the pane 14, and further extends along the edges 12*ca*, 12*cd* of the pane 12.

Thus, the trim strips 16 extend along at least three edges of the pane 14 in the embodiment shown but may not necessarily cover these edges as will be detailed below. The trim strips 16 encapsulate the fixed window pane 14 and is thus an encapsulated trim. The trim strips 16 comprise therefore segments or profiles each extending along a portion of the longitudinal edges of the pane 14. Each profile of the trim strip has a length and a width, its length being greater than its width and extending along the portion of the longitudinal edges of the pane 14. The trim strips 16 extending along the edges 14*ca*, 14*cb*, 12*cd* and 14*cd* are over-molded trim strips, and the trim strip 16 extending along the edge 12*ca* is a non over-molded trim strip.

FIG. 2 shows a longitudinal profile which is called "third" profile 18. This third profile 18 extends along the edges 14*ca* and 12*ca*. The portion of the profile 18 shown in FIG. 2 is the one extending along the edge 12*ca* and is not over-molded.

The third profile 18 shown in FIG. 2 has first and second U-shaped portions 18*a*, 18*b* in cross section.

The first U-shaped portion 18*a* defines a longitudinal groove 24 that is oriented inwardly and is configured to receive a metallic frame 26 of a door, i.e., a door frame, of the motor vehicle. In the example shown, the metallic frame includes two substantially horizontal flanges that are superimposed and inserted into the groove 26. The first portion 18*a* includes an exterior wall 18*aa* connecting two lateral walls 18*ab*, 18*ac* defining the groove 26 therebetween.

The second U-shaped portion 18*b* defines a longitudinal groove 28 that is oriented downwardly in a plane parallel to the panes 12, 14 and which is configured to receive by sliding an upper portion of the movable window pane 12. The second portion 18*b* includes an interior wall 18*ba* and an exterior wall 18*bb* connected by a lateral wall which may be integrated in the lateral wall 18*ac* as shown in FIG. 2. The walls of the second portion 18*b* define the groove 28.

Both portions 18*a*, 18*b* include sealing lips intended to cooperate with the pane 12 and/or parts of the vehicle.

The third profile 18 further may include an elongated esthetic component 30 which extends along the profile 18 and is secured onto both portions 18*a*, 18*b*. The component 30 includes an esthetic exterior face 30*a* and an interior face 30*b*. The component 30 includes a substantially flat portion including the faces 30*a*, 30*b* and longitudinal hooks 30*c* extending inwardly from the inner face 30*b*. The hooks 30*c* are used to mechanically secure the component 30 onto the profile 18. The component 30 is intended to cover at least portions of the exterior walls 18*aa*, 18*bb* which both comprise grooves intended to receive the hooks 30*c* by snap fitting.

FIG. 3 still shows the third profile 18 and in particular its portion extending along the edge 14*ca* and is over-molded.

This portion of the profile 18 differs from the portion of FIG. 2 in that it does not comprise the interior wall 18*ba* and in that it is secured to the fixed window pane 12 by an over-molded material 50.

This over-molded material 50 extends onto the inner surface of the exterior wall 18*bb*, the downward surface of the lateral wall 18*ac* and also over the edge 14*ca* and portions of the surfaces 14*a*, 14*b* of the fixed window pane 14. This over-molded material 50 may have lips or legs intended to abut against parts of the vehicle.

FIG. 4 shows a longitudinal profile which is called "second" profile 20. This second profile 20 extends along the edge 14*cd* and is over-molded.

The second profile 20 shown in FIG. 4 is U-shaped in cross section and defines a longitudinal groove 32 that is oriented inwardly and is configured to receive a metallic frame 34 of the motor vehicle. In the example shown, the metallic frame 34 includes two substantially vertical flanges that are superimposed and inserted into the groove 32.

The second profile 20 includes an exterior wall 20*a* and two lateral walls 20*b*, 20*c* connected by the exterior wall 20*a*. The exterior wall 20*a* is usually parallel to the interior surface 14*b* of the fixed window pane 14 and is secured thereto by an over-molded material 36. In the example shown, the exterior wall 20*a* faces the interior surface 14*b* and spaced therefrom. This space S is filled in with the over-molded material 36.

The lateral wall 20*b* is substantially aligned with a portion (the rear edge 14*cd* in the example shown) of the peripheral edge 14*c* in a plane P1 that is perpendicular to the fixed window pane 14. The lateral wall 20*c* extends perpendicularly to and faces the interior surface 14*b*.

In the example shown, the over-molded material 36 further extends over the lateral wall 20*c* and the frond edge 14*cd*. The lateral wall 20*b* is free of such over-molded material 36. The over-molded material 36 is V-shaped (with an angle lower than 90°) in front of the rear edge 14*cd* and defines a first planar surface 36*a* aligned with the exterior surface 14*a* and a second planar surface 36*b* which extends between the first surface 36*a* and the profile 20 and is inclined with respect to the plane P1.

The second profile 20 includes sealing lips intended to cooperate with parts of the vehicle.

FIG. 5 shows another longitudinal profile which is called "first" profile 22. This first profile 22 extends along the edges 12*cd*, 14*cb* and is over-molded.

The first profile 22 shown in FIG. 5 is U-shaped in cross section and defines a longitudinal groove 38 that is oriented forwardly and is configured to receive a guiding mean 40 secured to the movable window pane 12.

The first profile 22 includes an exterior wall 22*a* and an interior wall 22*b* connected together by a lateral wall 22*c* and defining the groove therebetween. The exterior wall 22*a* is parallel to the interior surface 14*b* of the fixed window pane 14 and is secured thereto by an over-molded material 42. In the example shown, the exterior wall 22*a* faces the interior surface 14*b* and is L-shaped in cross section. The exterior wall 22*a* includes first and second parts 22*aa*, 22*ab* that are perpendicular one another, the first part 22*aa* being spaced from the interior surface 14*b* and extending between the lateral wall 22*c* and the second part 22*ab*. The second part 22*ab* is applied directly onto the interior surface 14*b*. The first part 22*ab* defines a space S with the interior surface 14*b* that is filled in with the over-molded material 42.

The over-molded material 42 further extends over at least a portion of the lateral wall 22*c*. The over-molded material 42 does not cover the peripheral edge 14*cb* along the first profile 22, i.e., the front edge 14*cb*.

The exterior wall 22*a* has a longitudinal edge 22*a*1 which is opposite to the lateral wall 22*c* that is substantially aligned with the front edge 14*cb* in a plane P2 that is perpendicular to the fixed window pane 14.

This longitudinal edge 22*a*1 carries a first sealing lip 44 which is configured to abut against both edge 14*cb* and 12*cd*. The sealing lip 44 is the sole member extending between the edges 14*cb* and 12*cd*. The sealing lip 44 is curved and defines a groove oriented inwardly. The lip 44 includes a longitudinal connecting edge 44*a* which extends in the plane P2 and is secured to the longitudinal edge 22*a*1, and further includes an opposite longitudinal sealing edge 44*b* abutting against the rear edge 12*cd* of the pane 12. The longitudinal portion of the sealing lip 44 extending between both edges 44*a*, 44*b* has an exterior surface 44*c* which is substantially aligned with the exterior surfaces 14*a*, 12*a*.

As far as the interior wall 22*b* of the first profile 22 is concerned, it crosses the plane P2 and is configured to face the guiding mean 40, and preferably also to face the interior surface 12*b* of the movable window pane 12 as shown in FIG. 5.

The interior wall 22*b* carries a second sealing lip 46 which is configured to be in sealing contact with the guiding mean 40. As shown in the embodiment of FIG. 6, the interior wall 22*b* may carry a third sealing lip 48 which is configured to be in sealing contact with the interior surface 12*b* of the movable window pane 12.

In another embodiment, only the first and the third sealing lips may be provided (no sealing is then provided on the guiding mean 40).

The guiding mean 40 may be formed of a single longitudinal part that is secured, for instance by gluing or over-molding, onto the interior surface 12*b* of the pane 12 and includes a guiding leg 40*a* crossing the plane P2 and received into the groove 38 for sliding motion. As shown in the drawings, the surfaces of the groove 38 may be coated with an antifriction layer 38*a* suitable to cooperate by sliding with the guiding mean 40 and in particular its leg 40*a*. Therefore, as shown in the drawings, the walls 22*a*, 22*b*, 22*c* may be coated with the antifriction layer 38*a* inside the groove 38.

As shown in FIGS. 2 to 6, each profile 18, 20, 22 may comprise at least one U-shaped metallic rail embedded or encapsulated into a polymeric covering. Each profile and its polymeric covering may be made by co-extrusion. The sealing lips may be made of an elastically deformable material, such as for example EPDM or thermoplastic. These lips may be realized by over-molding during a process where the profiles 18, 20, 22 are connected together in their interconnection zones. Of course, each profile might not comprise metallic rail and might therefore comprise only polymeric materials. Each profile may have polypropylene in areas where material rigidity is needed and the lips might be made of a softer material. The profiles forming the over-molded trim strips 16 are secured onto the fixed window pane 14 by over-molding by means of the over-molded material 36, 42 and 50.

Another embodiment of the disclosure could be as illustrated in FIG. 7, where the over-molded strip is composed of the two profiles 18 and 22, and not three profiles (18, 20, 22), and the fixed window pane 14 is substantially triangular (but could be any polygonally shaped).

FIGS. 8 and 9 show another embodiment of the profile 18 which does not comprise the component 30 described above.

In another embodiment shown in FIG. 10 and relative to the profile 20, the overmolding material 36 covers only a portion of the interior surface 14*b* and leaves free the rear edge 14*cd* of the fixed window pane 14. The lateral wall 20*b*, and in particular its outer side 20*ba*, is substantially aligned with the rear edge 14*cd* in a plane P1' that is perpendicular to the fixed window pane 14. The over-molded material 36 includes a planar surface 36 extending between the interior surface 14*b* and the exterior wall 20*a* and which is substantially parallel to the plane P1'.

FIGS. 11*a* to 11*g* show other embodiments of the profile 22.

Figure 11A:
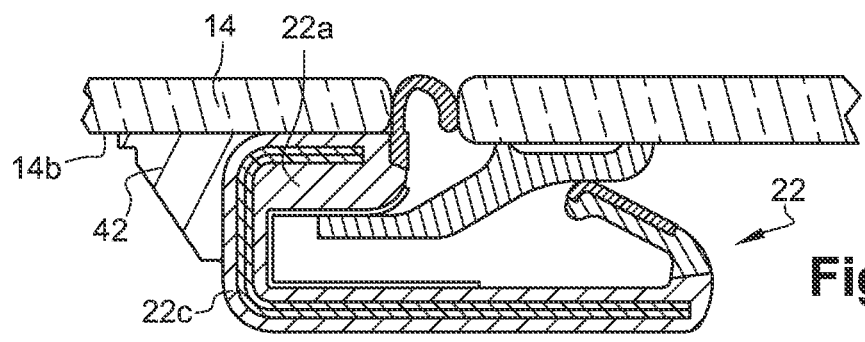
FIGS. 11a to 11g are views corresponding to the view of FIG. 5 and showing various embodiments.

In the embodiment of FIG. 11*a*, the exterior wall 22*a* is planar and its exterior surface is applied directly substantially on its whole extent onto the interior surface 14*b*. The over-molded material 42 extends between the lateral wall 22*c* and the interior surface 14*b*.

Figure 11B:
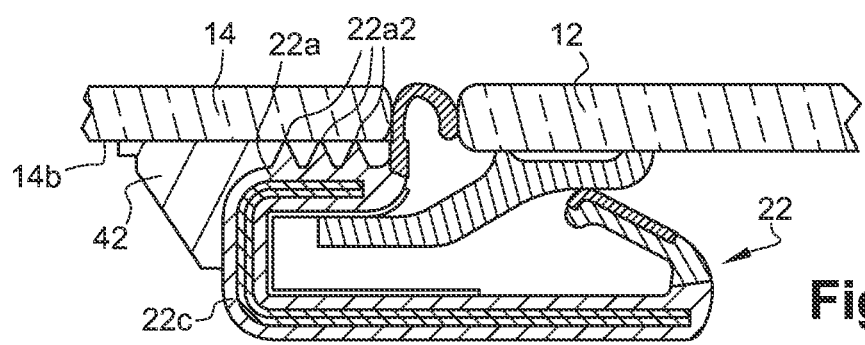

In the embodiment of FIG. 11*b*, the exterior wall 22*a* is planar and its exterior surface includes ridges 22*a*2. The exterior wall 22*a* is applied directly via the tops of these ridges 22*a*2 onto the interior surface 14*b*. The over-molded material 42 extends between the lateral wall 22*c* and the interior surface 14*b*. The over-material can extend in the space S.

Figure 11C:
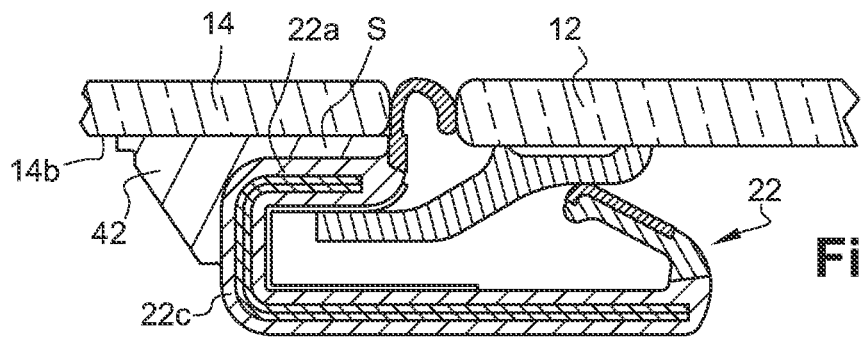

In the embodiment of FIG. 11*c*, the exterior wall 22*a* is planar and spaced from the interior surface 14*b*. The over-molded material 42 extends between the wall 22*a*, 22*c* and the interior surface 14*b* and fills in the space S.

Figure 11D:
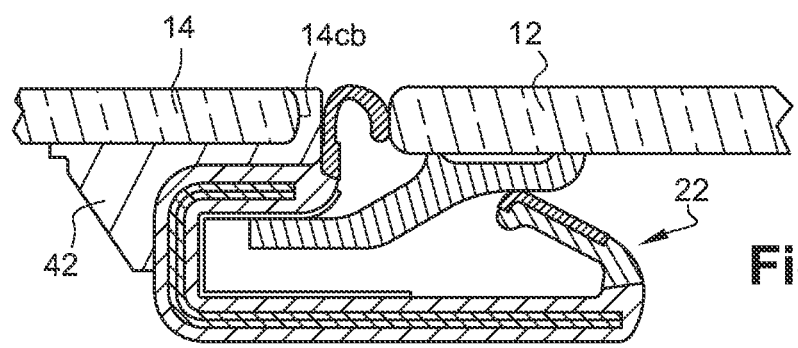

The embodiment of FIG. 11*d* differs from the one of FIG. 11*c* in that the over-molded material 42 further extends onto the edge 14*cb*.

Figure 11E:
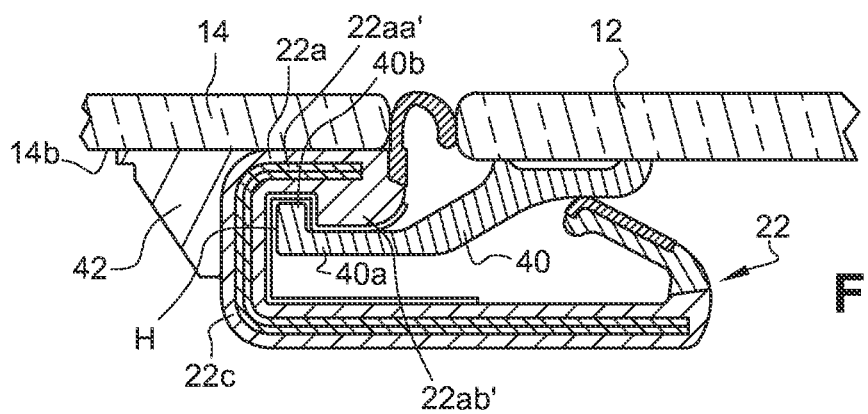

In the embodiment of FIG. 11*e*, the exterior wall 22*a* is L-shaped in cross section and includes first and second parts 22*aa*', 22*ab*' that are perpendicular one another. First part 22*aa*' is applied directly onto the interior surface 14*b* and extends between the lateral wall 22*c* and the second part 22*ab*'. The second part 22*ab*' extend inwardly and forms a flange configured to cooperate with the guiding mean 40 by sliding and/or abutting.

A cavity H is defined between the lateral wall 22*c* and the second part 22*ab*' and the guiding mean 40, and in particular its leg 40*a*, comprises a finger 40*b* intended to be located and retained into this cavity H.

The over-molded material 42 in FIG. 11*e* extends between the lateral wall 22*c* and the interior surface 14*b*.

Figure 11F:
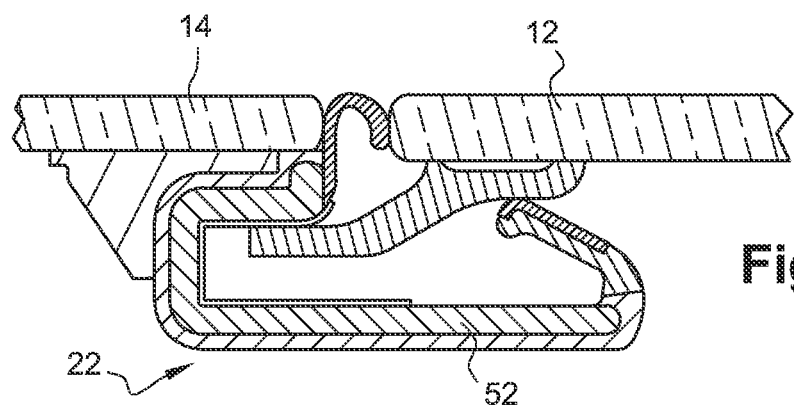
Figure 11G:
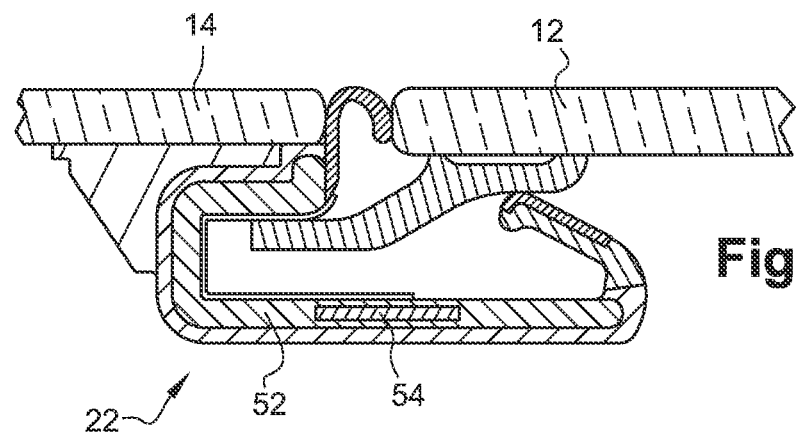

In the embodiment of FIG. 11*f*, the metallic rail is replaced by a polypropylene carrier 52 which can also be U-shaped. The embodiment of FIG. 11*g* differs from the embodiment of FIG. 11*f* in that it further comprises a metallic strip 54 embedded into the polypropylene carrier 52.

Figure 12:
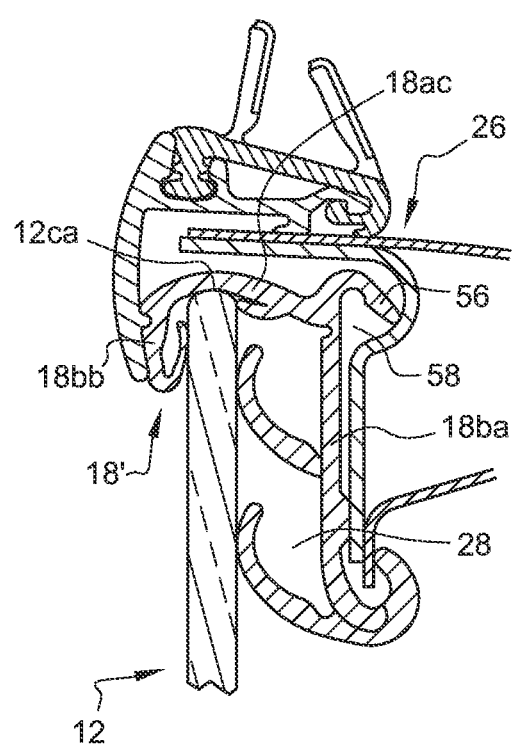
FIG. 12 is a cross sectional view along line A1-A1 of FIG. 1 according to another embodiment.
Figure 13:
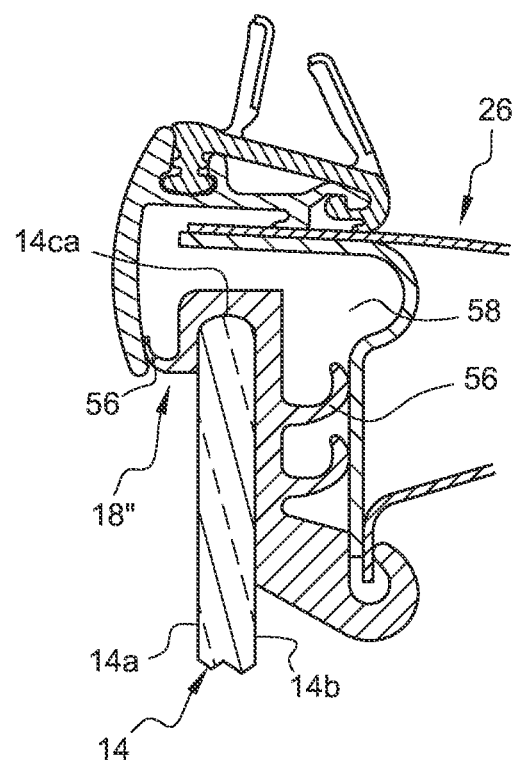
FIG. 13 is a cross sectional view along line A2-A2 of FIG. 1 according to another embodiment.

FIGS. 12 and 13 illustrate another embodiment of the fixed window module.

FIG. 12 is a cross sectional view similar to the one of FIG. 2 and shows a U-shaped portion 18' of the third profile which extends along the edge 12*ca* and FIG. 13 is a cross sectional view similar to the one of FIG. 3 and shows another U-shaped portion 18" of this third profile which extends along the edge 14*ca*.

The portion 18' of FIG. 12 is not over-molded. It defines a longitudinal groove 28 that is oriented downwardly in a plane parallel to the panes 12, 14 and which is configured to receive by sliding an upper portion of the movable window pane 12. The portion 18' includes an interior wall 18ba and an exterior wall 18bb connected by a lateral wall 18ac. The walls of the portion define the groove 28.

The portion 18' is mounted into a U-shaped channel 58 defined by metallic frames 26 of the motor vehicle. The portion 18' includes sealing lips intended to cooperate with the pane 12 and/or the frames 26 of the vehicle. Sealing lip(s) 56 may be used to fasten or retain the portion 18' into the channel 58.

The portion 18" of FIG. 13 is over-molded onto the pane 14. It extends onto both interior and exterior surfaces 14a, 14b of the pane 14, and onto the edge 14ca.

The portion 18" is mounted into a U-shaped channel 58 defined by the metallic frames 26 of the motor vehicle. The portion 18" includes sealing lips and abutting means intended to cooperate with the frames 26 of the vehicle. Opposite sealing lips 56 may be used to fasten the portion 18" into the channel 58.

The module of FIGS. 12 and 13 may comprise one of the (first) profile 22 as shown in FIGS. 11a to 11g.

The module of FIGS. 12 and 13 may comprise one of the (second) profile 20 as shown in FIGS. 4 and 10.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An encapsulated fixed window module for a motor vehicle, comprising:
    a fixed window pane having an exterior surface, an interior surface, and a peripheral edge extending between said exterior and interior surfaces,
    at least one trim strip extending along at least a portion of said peripheral edge, said trim strip comprising a first longitudinal profile which is U-shaped in cross section and which has an exterior wall, an interior wall, and a lateral wall connecting said exterior and interior walls, said exterior and interior walls being substantially parallel to said fixed window pane, said first longitudinal profile defining a longitudinal groove configured to receive a guiding means carried by a movable window pane,
    wherein said exterior wall of said first profile faces said interior surface and is secured thereto by an over-molded material, and wherein said exterior wall has a longitudinal edge which is opposite to said lateral wall and which is substantially aligned with said peripheral edge along said first longitudinal profile in a plane that is perpendicular to said fixed window pane,
    wherein said longitudinal edge of said exterior wall carries a first sealing lip which is configured to abut against said peripheral edge of said fixed window pane and also against a peripheral edge of said movable window pane, and
    wherein said first sealing lip is the sole member extending between said peripheral edges of said fixed window pane and of said movable window pane, along said first longitudinal profile.

2. The encapsulated fixed window module as claimed in claim 1, wherein said over-molded material does not cover said peripheral edge along said first longitudinal profile.

3. The encapsulated fixed window module as claimed in claim 1, wherein said first sealing lip has a connecting edge which extends in said plane.

4. The encapsulated fixed window module as claimed in claim 1, wherein said exterior wall of said first longitudinal profile is applied onto said interior surface.

5. The encapsulated fixed window module as claimed in claim 1, wherein said exterior wall is L-shaped in cross section and includes first and second parts that are perpendicular one another, said first part being spaced from said interior surface and extending between said lateral wall and said second part, said second part being applied directly onto said interior surface.

6. The encapsulated fixed window module as claimed in claim 1, wherein said exterior wall defines a space with said interior surface that is filled in with said over-molded material.

7. The encapsulated fixed window module as claimed in claim 1, wherein said over-molded material extends at least between said exterior and lateral walls and said interior surface.

8. The encapsulated fixed window module as claimed in claim 1, wherein said interior wall crosses said plane and is configured to face said guiding means.

9. The encapsulated fixed window module as claimed in claim 8, wherein said interior wall carries a second sealing lip which is configured to be in sealing contact with said guiding means.

10. The encapsulated fixed window module as claimed in claim 8, wherein said interior wall carries a third sealing lip which is configured to be in sealing contact with said movable window pane.

11. The encapsulated fixed window module as claimed in claim 1, wherein said exterior wall is coated with an antifriction layer inside said longitudinal groove.

12. The encapsulated fixed window module as claimed in claim 1, wherein said lateral wall is coated with an antifriction layer inside said longitudinal groove.

13. The encapsulated fixed window module as claimed in claim 1, wherein said interior wall is coated with an antifriction layer inside said longitudinal groove.

14. The encapsulated fixed window module as claimed in claim 1, further comprising a second longitudinal profile which is U-shaped in cross section and which has an exterior wall connecting therebetween two lateral walls, said second longitudinal profile defining a longitudinal groove configured to receive a metallic frame of the motor vehicle.

15. The encapsulated fixed window module as claimed in claim 14, wherein said exterior wall of said second longitudinal profile is parallel to said interior surface and is secured thereto by an over-molded material, one of said lateral walls of said second longitudinal profile being substantially aligned with a portion of said peripheral edge in a plane that is perpendicular to said fixed window pane, and the other of said lateral walls of said second longitudinal profile extending perpendicularly and facing said interior surface.

16. The encapsulated fixed window module as claimed in claim 15, wherein said exterior wall of said second longitudinal profile is spaced from said interior surface.

17. The encapsulated fixed window module as claimed in claim 16, further comprising a third longitudinal profile which connects therebetween first and second longitudinal profiles.

18. The encapsulated fixed window module as claimed in claim 1, further comprising a third longitudinal profile which extends along at least an upper portion of said peripheral edge of said fixed window pane, and which is adjacent to said first longitudinal profile.

19. The encapsulated fixed window module as claimed in claim 17, wherein said third longitudinal profile comprises first and second U-shaped portions, said first U-shaped portion being configured to receive a metallic frame of the motor vehicle and the second U-shaped portion being configured to receive said movable window pane.

20. The encapsulated fixed window module as claimed in claim 19, wherein said first and second U-shaped portions define respectively two longitudinal grooves which are perpendicular one another.

21. A motor vehicle, comprising the at least one encapsulated fixed window module as claimed in claim 1.

22. The motor vehicle as claimed in claim 21, which comprises a door including a door frame, the movable window pane, and said encapsulated fixed window module, said movable window pane having an exterior surface, an interior surface, and a peripheral edge extending between said exterior and interior surfaces, wherein said exterior surfaces of said encapsulated fixed window module and of said movable window pane are substantially coplanar.

* * * * *